United States Patent

Preiss

[15] 3,696,338

[45] Oct. 3, 1972

[54] DATA TERMINAL-COMPUTER SERIAL INTERFACE SYSTEM HAVING AUTOMATIC BAUD RATE SWITCHING

[72] Inventor: Richard B. Preiss, Beaverton, Oreg.

[73] Assignee: Tektronix, Inc., Beaverton, Oreg.

[22] Filed: Aug. 20, 1970

[21] Appl. No.: 65,401

[52] U.S. Cl. ....................340/172.5
[51] Int. Cl. ....................G06f 3/00
[58] Field of Search ....................340/172.5; 235/157

[56] References Cited

UNITED STATES PATENTS

| | | | |
|---|---|---|---|
| 3,308,439 | 3/1967 | Tink et al. | 340/172.5 |
| 3,461,432 | 8/1969 | Keiter et al. | 340/172.5 |
| 3,453,601 | 7/1969 | Bogert et al. | 340/172.5 |
| 3,417,378 | 12/1968 | Simonsen et al. | 340/172.5 |
| 3,337,855 | 8/1967 | Gattner et al | 340/172.5 |
| 3,460,098 | 8/1969 | Blauw | 340/172.5 |
| 3,548,380 | 12/1972 | Gattner | 340/172.5 |

*Primary Examiner*—Paul J. Henon
*Assistant Examiner*—Mark Edward Nusbaum
*Attorney*—Buckhorn, Blore, Klarquist and Sparkman

[57] ABSTRACT

Interface circuits for transmitting digital information serially from a computer data terminal through a transmit data line to a computer and also in the reverse direction through a receive data line from the computer to the data terminal provide automatic electronic switching responsive to transmission of information through the transmit data line for disconnecting the pulse output of a high frequency clock from a single interface clock line, and at the same time connecting a lower frequency clock to this clock line. The clocks control transmit and receive registers in the interface to produce one rate of data transmission when no data is being transmitted in the direction from the data terminal to the computer and a lower rate of data transmission when data is being transmitted in such direction. A terminal busy inhibit signal from the data terminal may also be employed to prevent transmission of clock pulses by the clock line when the data terminal is not ready to receive data.

6 Claims, 2 Drawing Figures

RICHARD B. PREISS
*INVENTOR*

*BY*

*BUCKHORN, BLORE, KLARQUIST & SPARKMAN*
*ATTORNEYS*

DATA TERMINAL-COMPUTER SERIAL INTERFACE SYSTEM HAVING AUTOMATIC BAUD RATE SWITCHING

BACKGROUND OF INVENTION

Computer data terminals are employed to convert various types of data, such as alphamerical or graphical data, to digital form usable by the computer and to receive data in digital form from the computer. The received data may be either a reflex of the data transmitted from the data terminal to the computer or data originating in the computer. The terminal converts the received digital data to a form more intelligible to an operator at the data terminal.

The data at the inputs and the outputs of both the data terminal and the computer is usually in parallel digital form. There may be a substantial distance between the data terminal and the computer and in order to employ as small a number of conductors as practicable extending over this distance, the data is ordinarily transmitted in serial form in both directions between the data terminal and the computer. To accomplish this, a data terminal interface is conventionally provided with a transmit register for converting groups of bits of data from the data terminal, referred to in this application as data words, from parallel data into serial data which is transmitted to the computer interface and a receive register for converting data words of serial data from the computer interface into parallel data. Similarly a computer interface is provided with a receive register for converting the data words of serial data from the transmit register of the data terminal interface into data words of parallel data which can be utilized by the usual monitor buffer of the input circuits of the computer in accordance with the computer softwave driver routines and interrupt sequences. The computer interface also includes a transmit register for converting data words of parallel data from the computer to serial data for transmission to the receive register of the terminal interface. All of such receive and transmit registers are actuated by clock pulses and receive or transmit serial data at baud rates proportional to the frequency of such clock pulses.

In general, a computer can transmit data to a data terminal much faster than the input circuits of the computer can receive data. Also the data terminal can both transmit and receive data much faster than the input circuits of the computer can receive data. Nevertheless, the transmit and receive registers of the data terminal and computer interfaces have conventionally been actuated by clock pulses from a single clock producing clock pulses of constant frequency. This meant that the transmission of serial data from the computer to the terminal was at the same low baud rate as that which could be employed for the transmission of serial data from the data terminal to the computer.

The type of system just described enabled serial data to be transmitted in both directions between the interfaces of the data terminal and the computer through a minimum number of circuits. Thus no more than three circuits, namely a transmit data line, a receive data line and interface clock line, were required for the actual transmission of the data. Such system also avoided the apparently necessary complication of switching circuits at each of the transmit and receive registers. The result, however, was to waste valuable time in transmitting data from the computer to the data terminal at an unnecessarily slow baud rate.

SUMMARY

In accordance with the present invention a simple system is provided in which a single electronic switching circuit is employed to merely change the frequency of the clock pulses supplied to the conventional interface clock line, for example, by switching between the pulse outputs of two different clock circuits operating at different frequencies. This switching circuit is made responsive to the transmission of data from the data terminal to the computer and is effective to automatically change from a relatively fast baud rate, employed for transmitting serial data from the computer to the data terminal when no data is being transmitted from the data terminal to the computer, to a slower baud rate, employed when serial data is being transmitted from the data terminal to the computer.

No additional switching circuits are required in either the data terminal interface of the computer interface to temporarily change from the faster baud rate to the slower baud rate and back again to the faster baud rate, nor are any additional circuits or lines requires between these interfaces. In fact, it is possible to leave the computer receive register connected to the conventional computer receive register clock without connecting it to the interface clock line, if the frequency of the lower frequency clock pulses supplied to such clock line closely approximates the frequency of the pulses from the computer receive register clock.

The switching from the higher baud rate to the lower baud rate is caused to occur at the instant the data terminal institutes the transmission of data from the data terminal transmit register to the computer receive register. Also a time delay is provided to prevent switching back to the higher baud rate until the last bit of digital data has been transferred to the computer receive register. For example, this time delay may be produced by a regriggerable one-shot multivibrator, retriggered by each bit of data delivered to the transmit data line and having a timing out period slightly longer than the time required to transmit one data word of the serial data at the slower of the two baud rates.

A simple circuit for inhibiting the transmission of clock pulses through the single interface line during busy periods of the data terminal is effective to provide interface flagging when the terminal is not ready to receive data.

DESCRIPTION OF THE PREFERRED EMBODIMENT

Figure 1:
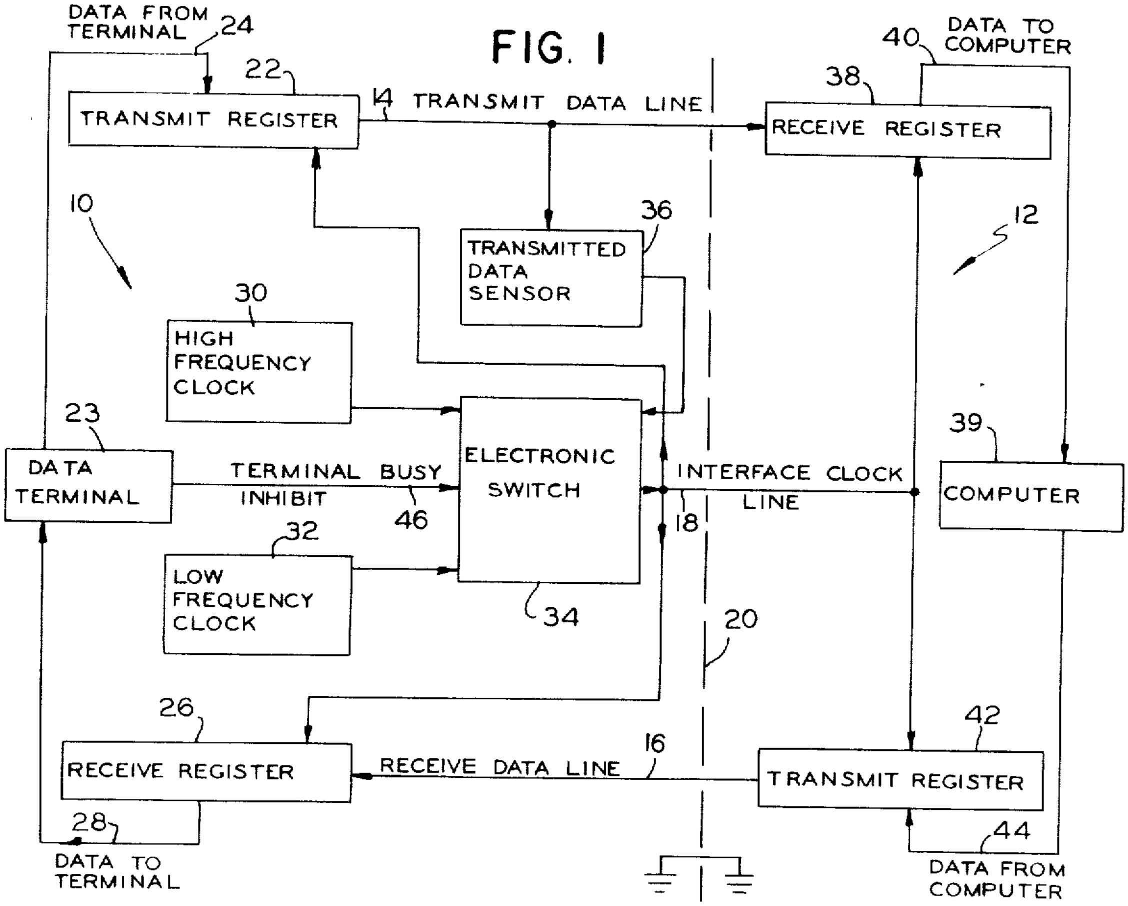
FIG. 1 is a block diagram of a preferred embodiment of a data terminal computer interface system in accordance with the present invention.

The system shown in FIG. 1 includes a computer data terminal serial interface indicated generally at 10 and a typical computer serial interface 12 connected together by a transmit date line 14, a receive data line 16 and an interface clock line 18. The boundary between these two interfaces is indicated by the vertical dotted line 20. The actual distance between the two interface circuits may, for example, be up to approximately 1,000 feet where direct electrical connections are employed.

The data terminal interface contains a transmit register 22 for receiving parallel digital data from a computer data terminal 23, such as that disclosed in Bulletin 400/C, Interactive Graphic Systems, which was published in early 1970, through connections 24 to the data terminal, and delivering such data in serial digital form to the transmit data line 14 under control of clock pulses from the interface clock line 18.

The data terminal interface 10 also contains a data terminal receive register 26 which receives serial digital data from the receive data line 16 under control of clock pulses from the interface clock line 18, and delivers such data in parallel form to the computer data terminal 23 through connections 28 also to such data terminal.

The clock pulses are delivered to the interface clock line 18 from either a high frequency clock circuit 30 or a low frequency clock circuit 32, each of which are disclosed in the G.E. Transistor Manual, 7th edition, 8/64, pages 315, 316, though an electronic switch 34, such as that disclosed in TTL Integrated Circuit Catalogue from Texas Instruments, No. CC2011R, Aug. 1, 1969, page 2–5, controlled by a transmitted data sensor circuit 36, such as that disclosed in Fairchild Semi-Conductor Integrated Circuit Catalogue, Copyright 1969, No. BR—BR–0015–29 100M, page 3–107, receiving and responsive to serial digital data being transmitted through the transmit data line 14. The transmitted data sensor circuit 36 may, for example, be a known or suitable type of retriggerable monostable or one-shot multivibrator containing a timing capacitor (not shown), which is charged to a predetermined voltage whenever a bit of serial data is delivered to the transmit data line 14 by the data terminal transmit register 22. The charged capacitor holds the multivibrator in its unstable or timing state for a predetermined time which is slightly longer than the time required to deliver a data word serially from the data terminal transmit register 22 to the transmit data line 14. Such a serial word may, for example, contain a starting bit, 1 to 7 data bits, an even-parity bit employed for error detection and 2 stop bits or a total of 11 bits.

If no bit of serial data is delivered to the transmit data line 14 within the predetermined time just discussed, the non-stable multivibrator times out and returns to its normal stable state until another bit of serial data is delivered to the transmit data line 14 from the data terminal transmit register 22. During the time such multivibrator is in its unstable or timing state, a switching signal is sent by the transmit data sensor circuit 36 to the electronic switch 34.

The electronic switch 34 connects the clock pulse output of the high frequency clock circuit 30 to the interface clock line 18 during time periods in which no switching signal is being sent to the electronic switch 34 from the transmit data sensor circuit 36. During time periods in which this switching signal is being sent to the electronic switch 34, the clock pulse output of the high frequency clock circuit 30 is disconnected from the interface clock line 18 by the electronic switch 34 and the clock pulse output of the low frequency clock circuit 32 is connected to such interface clock line. The result is that clock pulses from the high frequency clock circuit 30 are delivered to the interface clock line 18 when no serial data is being transmitted through the transmit data line 14, and that delivery of clock pulses from the low frequency clock circuit 32 to the interface clock line is initiated at the instant a first or start bit of a sequence of bits of serial data is delivered to the transmit data line. This start bit is actually delivered to the transmit data line under control of the clock pulses from the high frequency clock circuit 30, but control of the data terminal transmit register 22 is immediately transferred to the clock pulses from the low frequency clock circuit 32. When the transmit data sensor circuit 36 times out at a predetermined time after the last bit of a sequence of bits of serial data is delivered from the transmit register 22 to the transmit data line 14 and no further delivery of such data occurs during the timing period, the control of the register 22 is returned to the high frequency clock pulses from the clock circuit 30.

The computer interface 10 contains a computer receive register 38 connected to receive serial data from the transmit data line 14 and to deliver data words of such data in parallel form to input circuits of the computer 39, such as that disclosed in the Digital Logic Handbook No. C–105, 1966, page 196, through connections 40. This register is also connected to the interface clock line 18 so as to be controlled by the low frequency clock pulses from the clock circuit 32. The time delay provided by the transmitted data sensor circuit 36, described above, allows all data to be transferred out of the computer receive register 38 before the electronic switch 34 causes delivery of high frequency clock pulses from the clock circuit 30 to the interface clock line. There is therefor never any data in the computer receive register 38 when the high frequency pulses from the clock circuit 30 are being supplied to such register from the interface clock line 18.

The computer interface 10 also contains a computer transmit register 42 connected to receive parallel data from the computer 39 through connections 44 to the computer. This register is also connected to receive clock pulses from the interface clock line 18, and converts data words of parallel data into serial data which is delivered to the data terminal receive data line 16.

It is conventional to immediately reflex data being transmitted to the computer from a computer data terminal back to such terminal from the input circuits of the computer and to provide for printing out or otherwise displaying such data at such terminal. This enables immediate checking for errors in such data. This reflexing in the system shown in FIG. 1 is provided by the connections 44 to the computer 39, the computer transmit register 42, the data terminal receive line 16, the data terminal receive register 26 and the connections 28 to the data terminal 23.

The baud rate of the reflexed serial data will be that employed to transmit serial data from the data terminal transmit register 22 to the computer receive register 38 whenever such data is being continuously transmitted between such registers, since the low frequency clock pulses from the clock circuit 32 are being delivered to the registers 26 and 42 through the interface clock line 18 at such time. At any time, however, that the transmitted data sensor circuit 36 times out due to lack of delivery of serial data from the data terminal transmit register 22 to the transmit data line 14, the switching circuit 34 causes the higher frequency pulses from the clock circuit 30 to be delivered to the interface clock line. These pulses cause the computer transmit register 42 and the data terminal receive register 26 to operate at a faster rate to transmit any data awaiting reflexing from the computer 39 to the data terminal 23 to be transmitted at the higher baud rate discussed above. Also, in general, all other data transmitted from the computer 39 to the data terminal through the receive data line 16 is transmitted at such higher baud rate.

By way of example, the lower baud rate, at which the input circuits of the computer 39 can accept digital data from the data terminal 23, is of the order of 2,000 to 2,400 bauds. On the other hand, the higher baud rate, at which data can be transmitted from the computer 39 to the data terminal 23 may, for example, be of the order of 1 to 10 million bauds. Thus the frequencies of the pulse outputs of the clock circuit 32 will be those necessary to produce baud rates within the above ranges.

A data terminal such as the terminal 23 will ordinarily contain circuits for producing a transmission inhibit signal whenever such terminal is in a busy condition in which it is not ready to receive data. This signal can be sent to the electronic switch 34 through the connection 46 and utilized therein to prevent clock pulses from either of the clock circuits 30 or 32 being delivered to the interface clock line 18. This effectively prevents transmission of digital data in either direction between the data terminal 23 and the computer 39.

Figure 2:
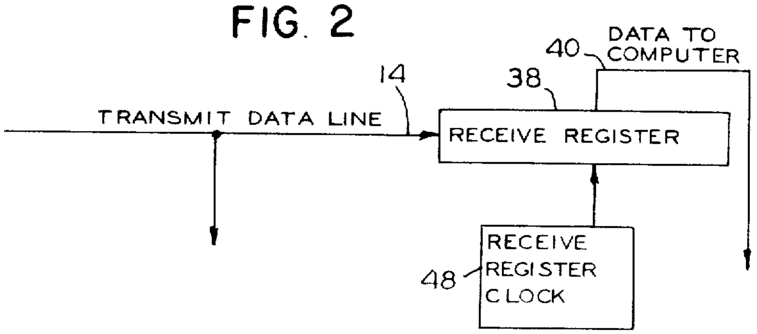
FIG. 2 is a fragmentary block diagram of a modification of the circuit of FIG. 1.

The modification of a portion of the system of FIG. 1 shown in FIG. 2, illustrates that the computer receive register 38 of the computer interface 10 may be driven by a conventional receive register clock circuit 48 instead of being connected to the interface clock line 18 of FIG. 1. If the pulse output frequency of the clock circuit 48 and the low frequency clock 32 of FIG. 1 at least closely approximate each other, the computer receive register 38 will correctly accept serial digital data transmitted from the data terminal transmit register 22 of FIG. 1 through the transmit data line 14 under control of the low frequency clock pulses from the low frequency clock circuit 26. This supply of clock pulses to the computer receive register 38 at a single frequency from the clock circuit 48 is possible, since data is never delivered to the transmit data line 14 from the data terminal transmit register 22 under control of the higher frequency pulses from the clock circuit 30.

I claim:

1. In an interface system for transmission of data in both directions between a computer data terminal and a computer, in which said system includes:

data terminal interface means and computer interface means having data circuit means for concurrently transmitting serial data in both said directions between said interfaces and also transmitting clock pulses between said interfaces;

data receiving means for said computer in said computer interface means and data transmitting means in said data terminal interface means for transmitting digital data from said data terminal in serial form to said data receiving means through said data circuit means under control of said clock pulses;

data receiving means for said data terminal in said data terminal interface means and data transmitting means in said computer interface means for transmitting digital data from said computer in serial form to said data receiving means in said data terminal interface means through said data circuit means under control of said clock pulses;

the improvement which comprises:

clock circuit means for producing clock pulses at a first frequency corresponding to a digital data baud rate compatible with the rate at which the input circuits of said computer can accept digital data from said data terminal and for also producing clock pulses at a higher frequency than said first frequency and compatible with a digital data baud rate at which said computer can transmit digital data and said data terminal can accept digital data from said computer;

and means responsive to the transmission of digital data through said data circuit means from said data terminal interface to said computer interface for causing said clock circuit means to supply clock pulses at said first frequency to both said interfaces during time periods in which digital data is being transmitted through said data circuit means from said data terminal interface to said computer interface and causing said clock circuit means to supply clock pulses at said higher frequency to said computer interface during time periods when data is not transmitted through said data circuit means from said data terminal interface to said computer interface.

2. The system of claim 1 in which:

said data receiving means in said computer interface means includes a data register for converting serial data to parallel data for use by said computer and said data register is connected for actuation by said clock pulses.

3. The system of claim 1 which also includes:

another clock circuit means for producing clock pulses at a frequency at least closely approximating said first frequency;

and said data receiving means in said computer interface is connected to said other clock circuit means for actuation by clock pulses from said other clock means.

4. The system in accordance with claim 1 in which:

said data transmitting means in said data terminal interface means is a data register for converting data words of parallel data from said data terminal to serial data and delivering bits of said serial data in sequence to said circuit means;

said electronic switching means includes switching circuit means normally causing said clock circuit means to supply pulses at said higher frequency;

and includes transmitted data sensing means connected to said data circuit means for sensing each bit of data delivered through said circuit means from said data terminal interface to said computer interface and sending a switching signal to said switching circuit means for causing said clock circuit means to supply pulses at said first frequency beginning at the time a first bit of data in a sequence of said bits is delivered through said data circuit means from said data terminal interface to said computer interface;

said transmitted data sensing means including time delay means for continuing said switching signal for a time beginning when the last bit of said sequence has been delivered through said data circuit means from said data terminal interface to said computer interface and extending for a period at least as great as the time required to transmit a serial data word through said data circuit means from said data terminal interface to said computer interface under control of said pulses at said first frequency.

5. The system in accordance with claim 4 in which:

said transmitted data sensing means is a retriggerable monostable multivibrator triggered by each of said bits of data in said sequence and having a time out period after being triggered by one of said bits of data at least as great as said time required to transmit said serial data word.

6. The system of claim 1 in which:

said electronic switching means includes means for receiving a terminal busy inhibit signal from said data terminal for preventing the delivery of clock pulses to said circuit means when said data terminal is busy and not ready to receive data from said computer.

* * * * *

PO-1050
(5/69)

UNITED STATES PATENT OFFICE
CERTIFICATE OF CORRECTION

Patent No. 3,696,338 Dated October 3, 1972

Inventor(s) RICHARD B. PREISS

It is certified that error appears in the above-identified patent and that said Letters Patent are hereby corrected as shown below:

Column 2, line 22, "of" should read --or--.
Column 2, line 26, "requires" should read --required--.
Column 2, line 42, "regriggerable" should read --retriggerable--.
References Cited: 3,337,855 8/1967, "Gattner et al" should read --Richard et al--.
References Cited: 3,548,380, "12/1972" should read --12/1970--.

Signed and sealed this 13th day of March 1973.

(SEAL)
Attest:

EDWARD M.FLETCHER,JR.
Attesting Officer

ROBERT GOTTSCHALK
Commissioner of Patents